United States Patent

Koike et al.

[11] Patent Number: 6,040,885
[45] Date of Patent: *Mar. 21, 2000

[54] LIQUID CRYSTAL DISPLAY WITH THREE DOMAINS WHEREIN MOLECULES IN THE THIRD DOMAIN ARE SUBSTANTIALLY VERTICALLY ALIGNED REGARDLESS OF VOLTAGE APPLICATION

[75] Inventors: Yoshio Koike, Atsugi; Katsufumi Ohmuro, Zama; Takahiro Sasaki, Atsugi; Arihiro Takeda, Yokohama, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/927,510

[22] Filed: Sep. 11, 1997

[30] Foreign Application Priority Data

Sep. 19, 1996 [JP] Japan ..................... 8-247623

[51] Int. Cl.[7] ................................... G02F 1/1337
[52] U.S. Cl. ..................... 349/129; 349/130; 349/123; 349/124
[58] Field of Search ..................... 349/129, 130, 349/124, 123

[56] References Cited

U.S. PATENT DOCUMENTS

| | | | |
|---|---|---|---|
| 3,602,782 | 8/1971 | Klein | 317/235 |
| 4,469,409 | 9/1984 | Nakano et al. | 349/132 |
| 5,309,264 | 5/1994 | Lien et al. | 349/130 |
| 5,473,455 | 12/1995 | Koike et al. | 349/132 |
| 5,477,358 | 12/1995 | Rosenblatt et al. | 349/130 |
| 5,550,662 | 8/1996 | Bos | 359/73 |
| 5,576,863 | 11/1996 | Aoki et al. | 349/124 |
| 5,612,450 | 3/1997 | Mizushima et al. | 349/123 |
| 5,638,201 | 6/1997 | Bos et al. | 349/130 |
| 5,666,178 | 9/1997 | Hirata et al. | 349/136 |
| 5,666,179 | 9/1997 | Koma | 349/143 |

Primary Examiner—William L. Sikes
Assistant Examiner—Tarifur R. Chowdhury
Attorney, Agent, or Firm—Greer, Burns & Crain, Ltd.

[57] ABSTRACT

A liquid crystal display device comprises: a pair of substrates, each having an electrode on an inner surface of said substrate: an alignment film on each the electrode; a liquid crystal material between the alignment films; a plurality of display cells in the liquid crystal material, each controlled by a voltage applied from the electrodes, each display cell comprising: a plurality of domains, each having mutually different pre-tilt angle, the pre-tilt angle being determined by said alignment films forming the domains; a separator region provided along a boundary of said domains, for preventing an influence of pre-tilt angle of adjacent domain, so that liquid crystal molecules in the separator region are substantially vertical with respect to the alignment film regardless to the voltage applied thereto. The separator region may be constituted by arranging the facing two alignment films such that at the center of the cell both the facing alignment films have the higher pretilt angle.

26 Claims, 16 Drawing Sheets

COMPARISON SAMPLE

1st EMBODIMENT

RELATION BETWEEN UV IRRADIATION PERIOD AND PRE-TILT ANGLE

VIEWING ANGLE CHARACTERISTICS OF 1st PREFERRED
EMBODIMENT (TWIST ANGLE 10°)

VERTICAL DIRECTION

VIEWING ANGLE CHARACTERISTICS OF 1st PREFERRED
EMBODIMENT (TWIST ANGLE 10°)

HORIZONTAL DIRECTION

2nd EMBODIMENT

RELATION BETWEEN RUBBING AMOUNT & PRE-TILT ANGLE

3rd EMBODIMENT

CF SUBSTRATE OF 5th EMBODIMENT

TFT SUBSTRATE OF 4th EMBODIMENT

4th EMBODIMENT

5th EMBODIMENT

6th EMBODIMENT

CF SUBSTRATE OF 8th EMBODIMENT

TFT SUBSTRATE OF 7th EMBODIMENT

7th EMBODIMENT

8th EMBODIMENT

CROSS-SECTION CUT VIEW OF FIG.15

OFF STATE

ON STATE

LIQUID CRYSTAL DISPLAY WITH THREE DOMAINS WHEREIN MOLECULES IN THE THIRD DOMAIN ARE SUBSTANTIALLY VERTICALLY ALIGNED REGARDLESS OF VOLTAGE APPLICATION

BACKGROUND OF THE INVENTION

1. Field of the Invention

The present invention relates to a liquid crystal display device, referred to hereinafter as an LCD, and particularly to a structure by employing plural micro domains respectively having different pre-tilt angles for enhancing the viewing angle range of a vertical alignment type LCD.

2. Description of the Related Arts

There have been attempted many kinds of improvements to enhance the range of viewing angle looking at LCD panels. As one of them, there is a method employing a vertical alignment type liquid crystal. There is another method that a single picture cell, referred to hereinafter as a cell, is divided into plural domains, which may be generally called micro domains, having different viewing angle characteristics so that the average of these characteristics is used to enhance the viewing angle characteristics. Furthermore, the viewing angle can be further extended by combining these two techniques.

The prior arts related to these techniques are hereinafter described with reference to FIGS. 14 to 17. FIG. 14 is of the case where the technique called "surrounding electrode method" is applied to a vertical alignment type LCD; and the method is disclosed in detail in Japanese Unexamined Provisional Patent Publication Tokukai Hei 7-13164. Outside glass substrates 12 & 14 are provided with polarizing plates which are not shown in the figures. Upon lower glass substrate 12 are arranged display electrodes 32 and alignment control electrodes 34. Upon upper glass substrate 14 are arranged opposing electrodes 36 each having a slit called alignment control window 36 H at the center of the cell. Upon electrodes 32 & 36 are arranged vertical alignment films 51 & 52, respectively. Between vertical alignment films 51 and 52 are sealed liquid molecules 50 having negative dielectric anisotropy. FIG. 14 illustrates the state of liquid crystal molecules 50 when the voltages are applied to the electrodes, which is hereinafter called "a voltage applied state" or an ON state.

When no voltage is applied to the electrodes, which is hereinafter called "a no-voltage applied state" or an OFF state, all the liquid crystal molecules are aligned almost vertical such as molecule 54 shown in FIG. 14. However, on the ON state molecules 53 excluding molecules 54 align not so straight as shown in FIG. 14. In controlling the alignment state, alignment control electrode 34 and alignment control window 36 play an important roll. At first, the alignment control electrode 34 acts to cause the electric field to bend as shown with the numeral 55. Consequently, the electric fields in the cell can be tilted outwardly as denoted with the numeral 56. Next, the electric field at the center of the cell is dispersed by forming alignment control window 36H at the central portion of opposing electrode 36 so that a region having a weak electric field can be formed at the center. Thus, the functions of alignment control electrodes 34 and alignment control window 35H can provide the liquid crystal molecules 53 & 54 with two kinds of alignment directions.

The liquid crystal display device shown in FIG. 14 employs for the alignment film a vertical alignment film having a uniform characteristic throughout the cell. On the contrary, there is a liquid crystal display device having an alignment film having in a single cell a plurality of domains respectively having different alignment characteristics as shown in FIGS. 15 to 17. The details are disclosed in Japanese Unexamined Patent Publication Toku Kai Hei 7-281176.

The latter liquid crystal display device shown in FIGS. 15 to 17 is constituted with a pair of first and second glass substrates 12 & 14 having liquid crystal 40 sealed therein, and polarizing plates 16 & 18 arranged respectively upon the outer sides thereof. Upon first glass substrate 12 are provided a color filter 20, a first transparent electrode 22 and a vertical alignment film 44. Upon second glass substrate 14 are provided a second transparent electrode 26 and a vertical alignment film 48.

Liquid crystal 40 is of a negative dielectric anisotropy, and is added with a chiral-dopant to accelerate the twist of the liquid crystal. Accordingly, when the voltage is not applied thereto the liquid crystal molecules are aligned almost vertical to the glass substrate surface as shown in FIG. 17A; and when the voltage is applied thereto the liquid crystal molecules are tilted towards the glass substrate surface so as to twist according to respective rubbing directions of the paired substrates and helical power of the liquid crystal itself as shown in FIG. 17B.

Here, vertical alignment films 44 & 48 have been treated so as to be divided into respective domains A & B as shown in FIGS. 15 & 16. In domain A, a first vertical alignment film 44 has been treated, i.e. rubbed, so that the liquid crystal molecules which contacts first vertical alignment film 44 have a pre-tilt angle $\alpha$ with respect to the substrate surface, while a second vertical alignment film 48 has been rubbed so that the liquid crystal molecules which contacts second vertical alignment film 48 have a pre-tilt angle $\beta$ with respect to the substrate surface. Pre-tilt angles $\alpha$ & $\beta$ are set close to 90°, however, are $\alpha<\beta$ by controlling the condition to form vertical alignment films 44 & 48. In the voltage application, liquid crystal molecules in between substrates 12 & 14 are likely to tilt according to the smaller pre-tilt angle a as shown in FIG. 17B. Then, pre-tilt angle $\alpha$ is, for example, 85°; and pre-tilt angle $\beta$ is, for example, 89°.

On the contrary, in the adjacent domain B, second vertical alignment film 48 has been rubbed so that the liquid crystal molecules which contacts first vertical alignment film 44 have a pre-tilt angle $\alpha$ with respect to the substrate surface, while first vertical alignment film 44 opposing thereto has been rubbed so that the liquid crystal molecules which contacts second vertical alignment film 48 have a pre-tilt angle $\beta$ with respect to the substrate surface, where also pre-tilt angles $\alpha$ & $\beta$ are set close to 90°, however, are also set so that $\alpha<\beta$. On the voltage application, the liquid crystal molecules at the mid of paired glass substrates 12 & 14 are likely to tilt following pre-tilt angle, $\alpha$, the smaller angle.

The region to correspond to a single cell becomes to have a viewing angle characteristics which is an average of viewing angles of two domains A & B because the region corresponding to the single cell is divided into two domains A & B respectively having viewing angle characteristics different from each other by 180°. Accordingly, this liquid crystal device can be provided with a largely extended viewing angle range.

The prior art illustrated in FIG. 15 is of a case where the twist angle in the voltage application is 45°.

In comparing the above two kinds of liquid crystal device, the former liquid crystal device shown in FIG. 14 has one more constitutional element than the latter liquid crystal device shown in FIGS. 15 to 17. That is, alignment control electrode 34 is newly required, which causes not only more complex structure but also a disadvantage in its aperture characteristic.

In the structure of the latter liquid crystal device shown in FIGS. 15 to 17, there may take place a case where the domain formation becomes unstable on the voltage ON state. More specifically, liquid crystal molecules 40C to be aligned almost vertically at the boundary of the domains of FIG. 17 do not always stably exist at the boundary of domains A and. B, but may be formed at a place deviated from the boundary, or may move around the boundary. In these cases, the balance of the area ratio of two domains A & B is deteriorated; accordingly, there is a problem in that not only the viewing angle characteristic is deteriorated but also the expansion of the discontinuous portion at the domain boundary further deteriorates the viewing angle characteristics as well as the aperture.

Therefore, in the latter liquid crystal device it is important to stably form the discontinuous portion at the boundary of two domains A and B.

SUMMARY OF THE INVENTION

It is a general object of the present invention to provide a liquid crystal display device allowing an expanded viewing angle characteristic by stably sustaining the plural domains in a single cell at a voltage applied state.

A liquid crystal display device according to the present invention comprises: a pair of substrates, each having electrodes on an inner surface of the substrate: an alignment film on each of the electrodes; a liquid crystal material between the alignment film; a plurality of cells, each controlled by a voltage applied from the electrodes, wherein each cell comprises: a plurality of domains, each having mutually different pre-tilt angle, where the pre-tilt angle is determined by the alignment film forming the domain; a separating region provided along a boundary of the domains in the cell for preventing an influence of pre-tilt angle of adjacent domain, so that liquid crystal molecules in the separator region can be substantially vertical with respect to the alignment film regardless to the voltage application.

In the description, the "liquid crystal molecules in the separator region is substantially vertical with respect to the alignment film" is such that the longitudinal axis of the liquid crystal molecules have an angle larger than 75° with respect to at least one of the substrates in pair. The state "substantially no voltage" indicates zero voltage or a low voltage close to zero. The voltage applied thereto indicates a voltage adequate to modify the state of the liquid crystal molecule, and includes a voltage to reproduce an intermediate, i.e. a half-tone, state.

Function of the liquid crystal display device of the above-mentioned structure is hereinafter described with reference to FIG. 1B. The parts employed in the prior art structure are denoted with the same numerals of FIG. 17. The numerals different from FIG. 17 are the numerals 44A & 48B, indicating alignment films each having a smaller pre-tilt angle α, and the numerals 44B & 48B indicating alignment films, each having a larger pre-tilt angle β.

The regions A & B where the alignment films having smaller pre-tilt angle α and larger pre-tilt angle β are facing each other form domains A & B when the voltage is applied thereto as shown in FIG. 1B. On this time, there is formed an alignment stabilizing region W1 in which the liquid crystal molecules are aligned substantially vertical similar to the case of no voltage application thereto at the boundary between domains A & B.

The alignment stabilizing region W1 acts as a separating wall to certainly separate the domains A & B so as to prevent one of the domains from invading into the other. Thus, the domains can be stably sustained.

The alignment stabilizing region W1 may be such that the alignment films 44B & 48B each having larger pre-tilt angle β are arranged so as to face each other at the boundary of the two kinds of domains A & B.

The liquid crystal molecules in alignment stabilizing region W1 are aligned substantially vertical owing to the alignment films having higher pre-tilt angle β and facing each other.

In order to provide the alignment stabilizing region, there may be provided an insulating film between the electrode and the alignment film at the boundary of adjacent domains A & B. The insulating film being arranged on the electrode causes the electric field lines to expand so as to avoid the insulating film thereon to separate the liquid crystal alignment into two states, that is domain A and domain B. Accordingly, the electric field strength in the vicinity of the insulating film is less than those in the domains at the sides so that the electric field lines tend to go vertical. Moreover, in the domains, thus expanded electric field lines help the alignment of the molecules in the domains to preferably enhance the alignment characteristic of the present invention. Consequently, the liquid crystal molecules in the thus formed alignment stabilizing region are aligned substantially vertical and kept stable, so as to work as a separating wall between the two adjacent domains so that the viewing angle characteristic is enhanced.

The above-mentioned features and advantages of the present invention, together with other objects and advantages, which will become apparent, will be more fully described hereinafter, with references being made to the accompanying drawings which form a part hereof, wherein like numerals refer to like parts throughout.

DESCRIPTION OF THE PREFERRED EMBODIMENT

Figure 1A:
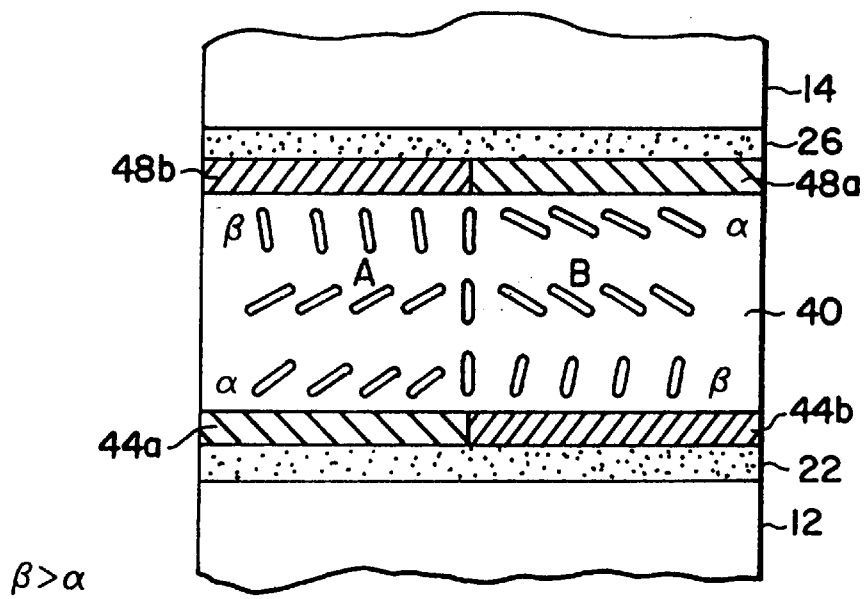
FIG. 1A schematically illustrates a cross-sectional cut view of a comparison sample to the first preferred embodiment.
Figure 1B:
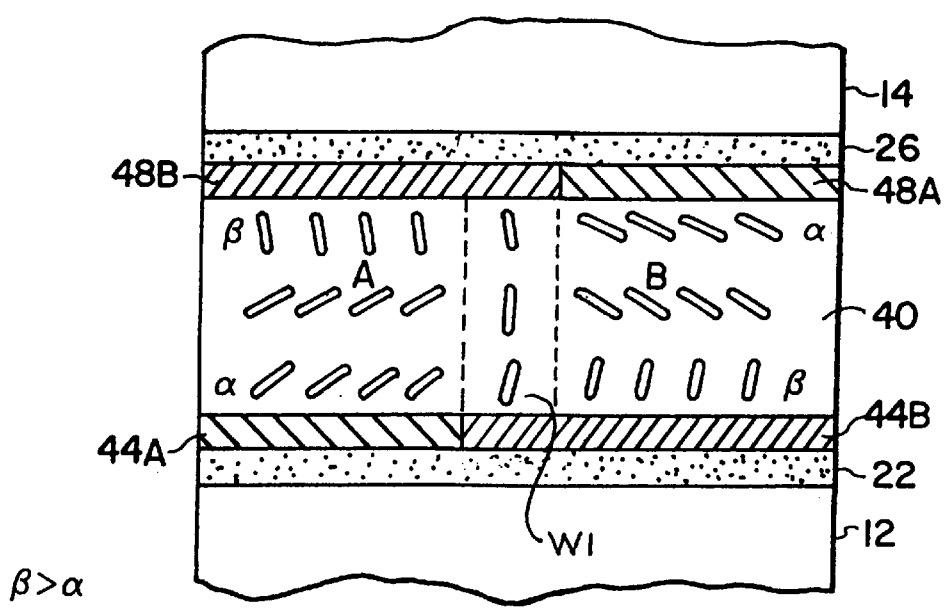
FIG. 1B schematically illustrates a cross-sectional cut view of a first preferred embodiment of the present invention.

Referring to FIG. 1B, a first preferred embodiment of the present invention is hereinafter described.

Upon inner surfaces of first and second glass substrates 12 & 14 are provided first and second transparent electrodes 22 & 26, respectively; and further respectively thereupon are provided alignment films of polyimide 44A, 44B, 48A and 48B, such that alignment film 48B/44B providing high pre-tilt angle β and alignment film 44A/48A providing low pre-tilt angle α are continuously adjacent with each other, respectively. Two glass substrates 12 & 14 are assembled such that alignment films 48B and 44B each providing high pre-tilt angle β are facing each other by a width $l_1$ in the alignment stabilizing region W1. And, a liquid crystal 40 is sealed in between the alignment films.

The alignment films having two kinds of pre-tilt angles α & β are formed by locally irradiating an ultraviolet light via a photo mask onto polyimide alignment films coated thereon in advance as hereinafter described in detail.

(a) Coating a polyimide film upon a glass substrate having transparent electrodes thereon by a spin coat method, and performing a heat treatment thereof.

(b) Performing a rubbing treatment of the polyimide films in predetermined directions, respectively. The rubbing directions in FIG. 1B is from 44A to 44B, and from 48B to 48A, respectively.

(c) Setting a photo mask having apertures for allowing a light to pass therethrough, on the areas to have the smaller pre-tilt angle α.

(d) Irradiating an ultraviolet light having a wavelength shorter than 254 nm of 2000 mJ/cm² strength by the use of a low pressure mercury light onto the polyimide film having the photo mask set thereon for about five minutes. The low pressure mercury light efficiently generating an ultraviolet light is effective in converting the polyimide film. However, it is apparent that another ultraviolet generating light source may also be employed thereto.

The rubbing step (b) may be performed later than the exposure step (d).

The pre-tilt angles of the alignment films formed in these process are 89.5° in the region to which no ultraviolet light has been irradiated, and 85° in the region to which the ultraviolet light has been irradiated. An ultra violet light shorter than 254 nm wave length allows an efficient conversion of the alignment film.

Figure 2:
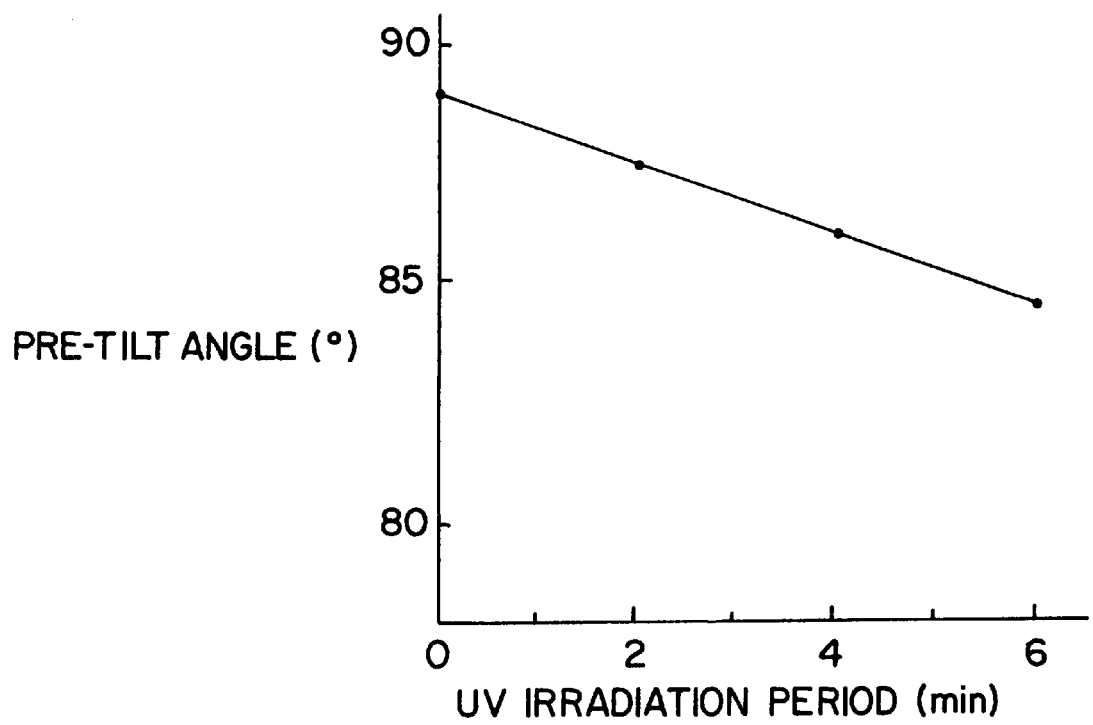
FIG. 2 shows the relation between the ultra violet irradiation period and the pre-tilt angle.

Data showing the capability of controlling pre-tilt angle by the use of ultra violet light irradiation is disclosed in FIG. 2 in detail. Here is employed a polyimide film material (model SE1211 made by Nissan Chemicals) which provides a smaller pre-tilt angle by the irradiation of the ultra violet light; however, on the contrary there is also available an alignment film material to provide larger pre-tilt angle by the irradiation of the ultra violet light (for example, model RN-783 made by Nissan Chemicals).

Thus formed glass substrates 12 & 14 are assembled in a pair so that the alignment films having the high pre-tilt angle β face each other by 5 μm width $l_1$ in the alignment stabilizing region W1. Then, liquid crystal is sealed in between the two glass substrates to complete the liquid crystal device. Model ZLI2806 made by Merck KGaA having a refractive index anisotropy Δn=0.0437 and dielectric anisotropy Δε=−4.8 was employed for the liquid crystal material.

The domains in the cell were observed while a voltage, typically 5 V, was applied to this liquid crystal device. Then, it was observed that two kinds of domains were clearly existing and the boundary of the domains are stable when increasing the applied voltage, and it was confirmed that two kinds of micro domains were stably coexisting.

Width $l_1$ where the alignment films having high pre-tilt angle β face each other is preferably at the range 5 to 20 μm. If it is below 5 μm, it is difficult to control the preciseness of aligning the paired substrates. A width larger than 20 μm is not preferable from the view point of the aperture.

Figure 3A:
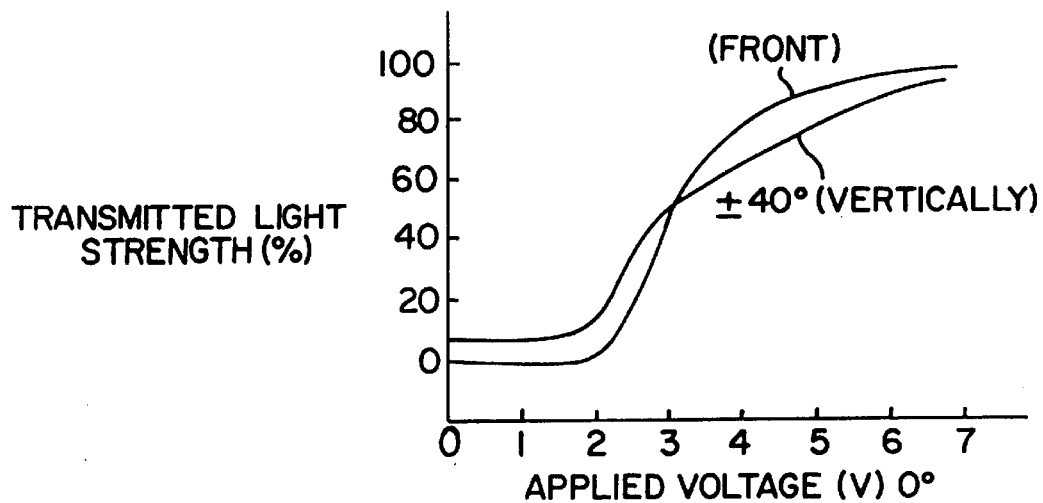
FIGS. 3A & 3B show view angle characteristics, where the twist angle is 10°, of the liquid crystal display device of the first preferred embodiment.
Figure 3B:
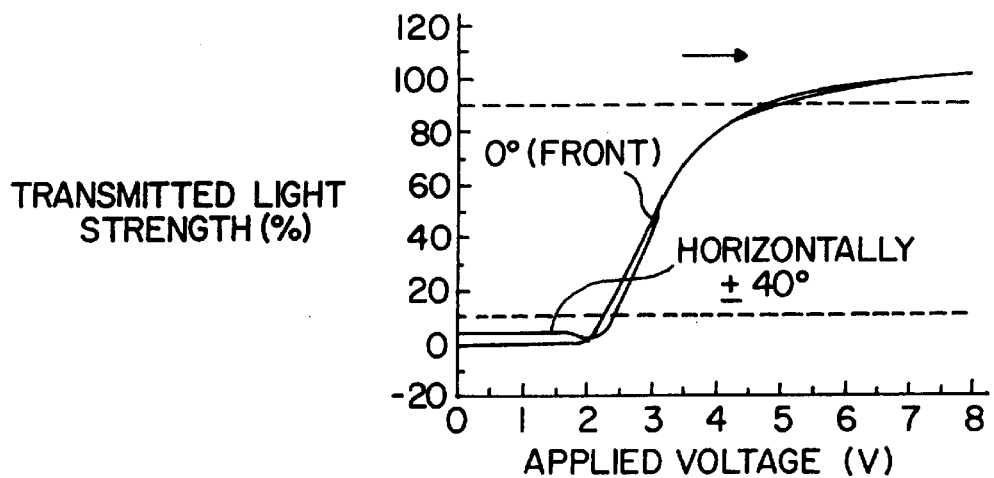

Practical electro-optical characteristics of the first preferred embodiment where the liquid crystal has a twist angle of 10° is hereinafter described referring to FIGS. 3A and 3B. Viewing angle characteristics along the vertical direction are shown in FIG. 3A, Viewing angle characteristics along the horizontal direction shown in FIG. 3B, It is observed that these data exhibit much wider viewing angle characteristics than a prior art TN type liquid crystal display device.

On the other hand, in order to compare with the first preferred embodiment of the present invention a liquid crystal device having none of the facing width $l_1$ of high tilt-angle alignment films as shown in FIG. 1A was fabricated. Alignment films 48a & 48b and 44a & 44b shown in FIG. 1A, where suffices a and b respectively indicates pre-tilt angles α (85°) and β (89.5°), were fabricated in the method similar to that of the above-described first preferred embodiment, as well as similarly rubbed. The upper and lower glass substrates 14 & 12 are arranged so that the boundary of the alignment films having respectively different pre-tilt angles are rightly opposing in between upper and lower glass substrates 14 & 12, and a liquid crystal is sealed in therebetween. In observing this liquid crystal device, the observed two kinds of domains A & B were unstable with respect to the applied voltages such that the location of the boundary irregularly moves. It was thus confirmed that the structure shown in FIG. 1A is not only unstable in the display itself but also inferior in the display quality such as the viewing angle range and the aperture. Accordingly, the superiority of the first preferred embodiment shown in FIG. 1B was confirmed.

Though in the first preferred embodiment there was described the method to control the pre-tilt angles of the alignment films having plural domains by adjusting radiation strength of the ultra violet light, the method to control the pre-tilt angles is not limited to this method, but also, for example, alignment films having plural pre-tilt angles can be accomplished by another method similar to the first preferred embodiment as long as the plural domains are controlled to have different rubbing strength.

A second preferred embodiment of the present invention is hereinafter described, referring to FIG. 4.

Figure 4:
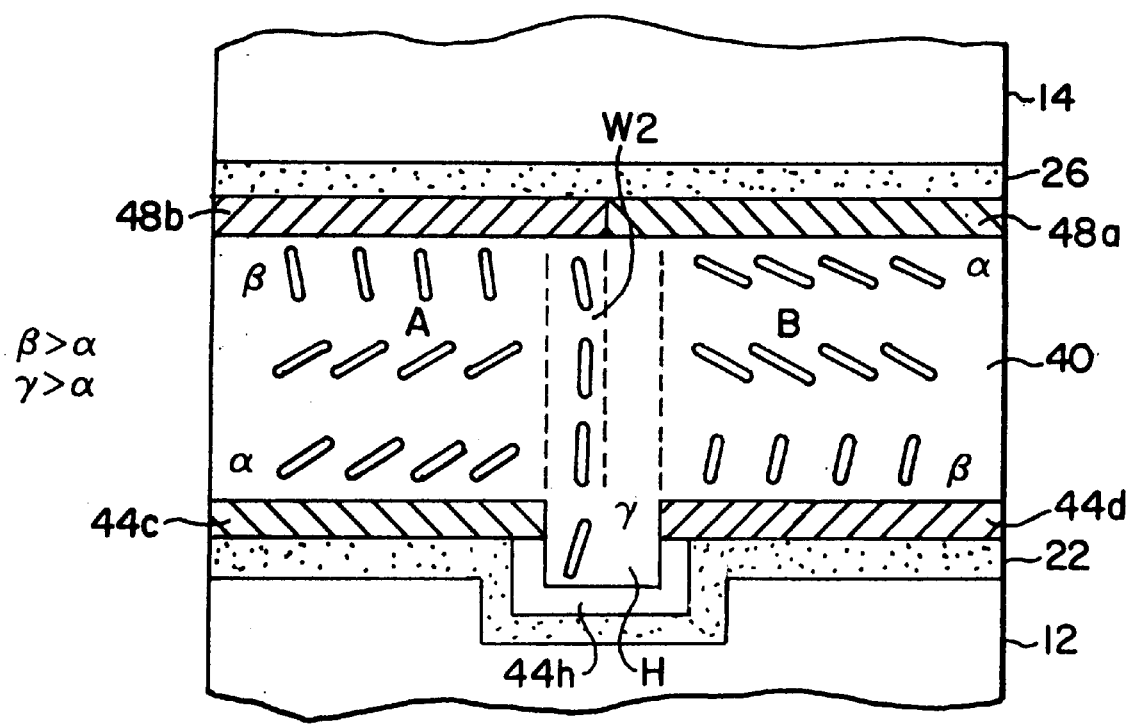
FIG. 4 schematically illustrates a cross-sectional cut view of a second preferred embodiment of the present invention.

Upon first and second glass substrates 12 & 14 are arranged transparent electrodes 22 & 26 respectively; and thereupon are arranged alignment films of polyimide 44c, 44d, 48a & 48b as shown in FIG. 4, similar to alignment films 44A, 44B, 48A & 48B of the first preferred embodiment except that there is further provided a depression H of alignment film 44h between alignment films 44c & 44d on the first glass substrate 12 so that depression H faces rightly the boundary of alignment films 48a & 48b on the second glass substrate 14.

Depression H is formed by coating transparent electrode 22 and alignment film 44 on a glass substrate having a depression thereon. The typical size of depression H is approximately 1 $\mu$m deep and 5 to 10 $\mu$m wide.

These alignment films 44c & 48a and, 44d & 48b are formed by selective irradiation of the ultra violet light so as to have two kinds of pre-tilt angles $\alpha$ & $\beta$, respectively, as shown in FIG. 4.

Figure 5:
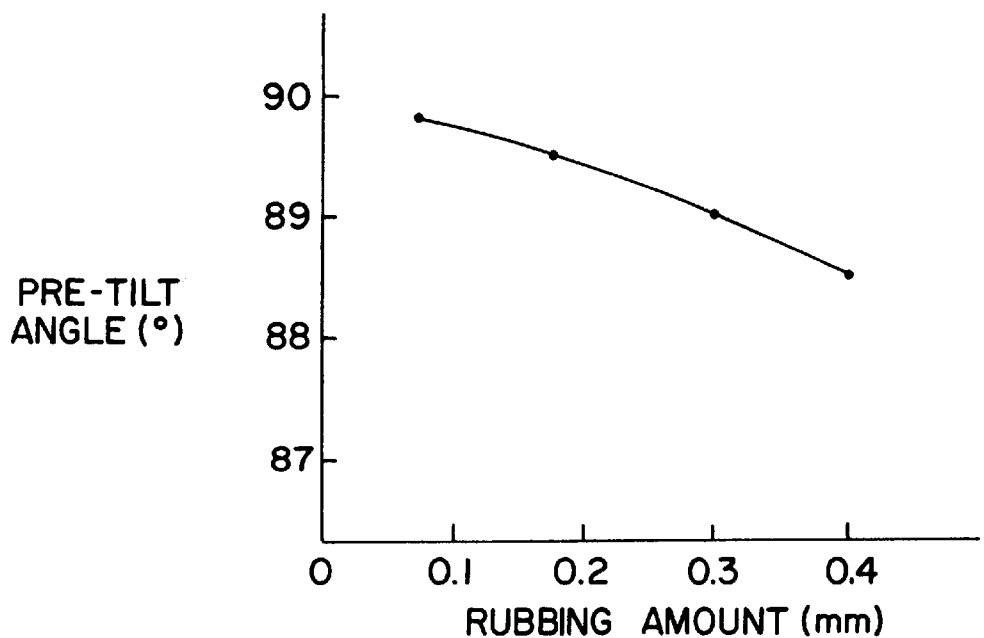
FIG. 5 shows the relation between the amount of rubbing operation and pre-tilt angle.

By rubbing the alignment films 44c, 44d & 44h on first glass substrate 12, a pre-tilt angle $\gamma$ of alignment film 44h at the bottom of depression H can be of larger pre-tilt angle than pre-tilt angle $\alpha$ of region A having no depression, due to less rubbing strength in depression H than that of other alignment films. Relation between rubbing strength and pre-tilt angle is such that the pre-tilt angle decreases as the rubbing strength increases as shown in FIG. 5, where the rubbing amount indicated on the abscissa in the figure is almost proportional to the rubbing strength. The practical values of pre-tilt angles $\alpha$ & $\beta$ are respectively 85° & 89.5°; and pre-tilt angle $\gamma$ is 89.8°. The rubbing operation was performed along the direction from alignment film 44c to alignment film 44d.

Owing to alignment film 44h having high pre-tilt angle $\gamma$ in depression H at the boundary of alignment films 44c & 44d of first glass substrate 12, there can be formed an alignment stabilizing region W2 in which high pre-tilt angles $\beta$ and $\gamma$ are facing each other between alignment film 44h in depression H and alignment film 48b having high pre-tilt angle $\beta$ on the second glass substrate 12. In alignment stabilizing region W2 can stably exist liquid crystal molecules aligned almost 90°. Consequently, alignment stabilizing region W2 can perform as a barrier that is a separating wall, so that two domains A & B at both the sides can be stably sustained.

The preferable depth of depression H depends also on its width; accordingly, the depth may be such as to cause the difference in the effect of the rubbing operation performed on the alignment films and the depression. For example, 1 to 3 $\mu$m depth is practical if the cell is about 5 $\mu$m thick.

Such a kind of depression H may be provided on both the glass substrates, too.

Figure 6:
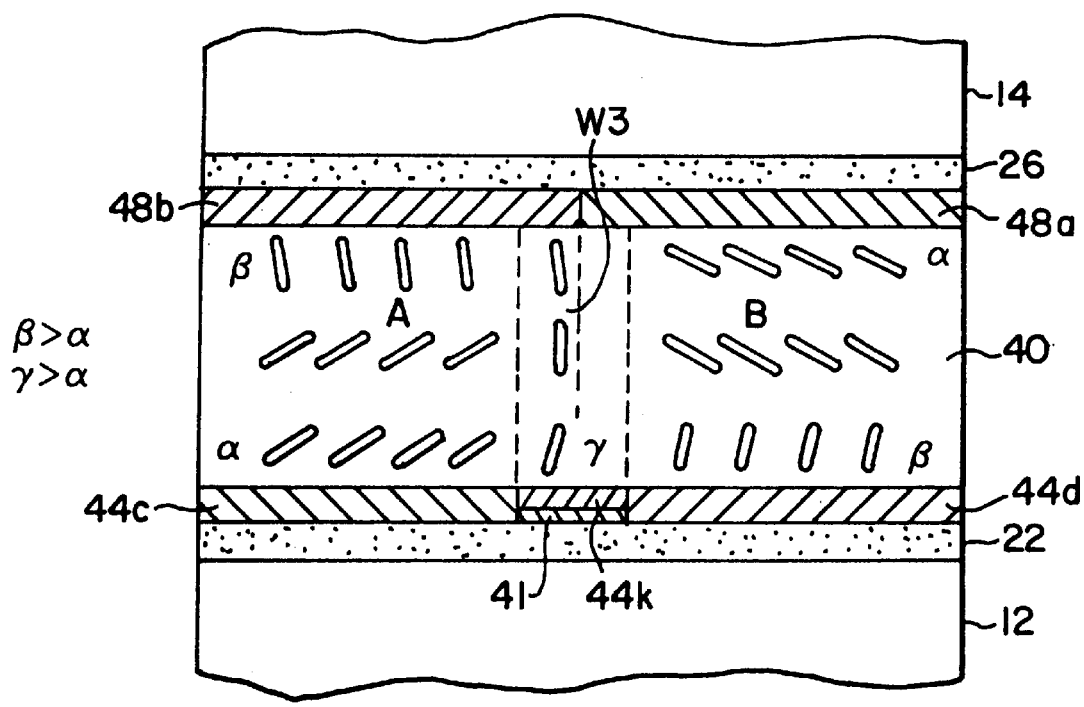
FIG. 6 schematically illustrates a cross-sectional cut view of a third preferred embodiment of the present invention.

A third preferred embodiment of the present invention is hereinafter described, referring to FIG. 6.

Second glass substrate 14 carrying alignment films 48a & 48b and transparent electrode 26 are substantially identical to those of the first and second preferred embodiments.

The difference from the first and second preferred embodiments is in that an alignment film 44k to be a boundary of two alignment films 44c & 44d arranged upon transparent electrode 22 provided on first glass substrate 12 has an undercoat film 41 therebeneath. For undercoat 41 is employed a coupler, such as a silane coupling agent model AP400 made by Toray. Upon a patterned layer of AP400 coated as thick as approximately 100 Å and baked at approximately 200° C. is formed an alignment film of polyimide as thick as 500 to 1000 Å.

Now, the coupling agent 41 strengthening the adhesion of alignment film to the electrode therebeneath so as to reduce the effect given from an external force. Accordingly, the uniformly performed rubbing operation gives less rubbing effect onto the alignment film 44k having the coupling agent 41. Thus, alignment film 44k is provided with a higher pre-tilt angle $\gamma$ than those of other alignment films 44c & 44d. Pre-tilt angles $\alpha$, $\beta$ and $\gamma$ are 85°, 89.5° and 89.8°, respectively.

Thus formed alignment film 44k having the high pre-tilt angle $\gamma$ at the portion to be a boundary of alignment films 44c & 44d on the first glass substrate allows to form an alignment stabilizing region W3 via which high pre-tilt angles $\beta$ & $\gamma$ are opposing each other between alignment film 44k and alignment film 48 having high pre-tilt angle $\beta$ of second glass substrate.

Similar to the second preferred embodiment, the liquid crystal molecules aligned almost 90° can stably exist in alignment stabilizing region W3. Consequently, this alignment stabilizing region W3 acts as a barrier, i.e. a separating wall, for two domains A & B of both the sides to be able to be sustained stably.

Such an under coat film 41 may be provided on both the substrates.

Fourth and fifth preferred embodiments are hereinafter described where a TFT (thin film transistor) and a CF (color filter) are employed in the liquid crystal display device of the second preferred embodiment, referring to FIG. 7A, a plan view, and FIG. 8, a cross-sectional view.

This color TFT liquid crystal display device is constituted with a first glass substrate assembly, referred to hereinafter as TFT substrate assembly, 110S, a second glass substrate assembly 210S carrying a color filter CF, a liquid crystal 170 sealed in between the two glass substrate assemblies, and polarizing plates 111 & 211 placed on external surface of substrate assemblies, respectively.

Figure 8:
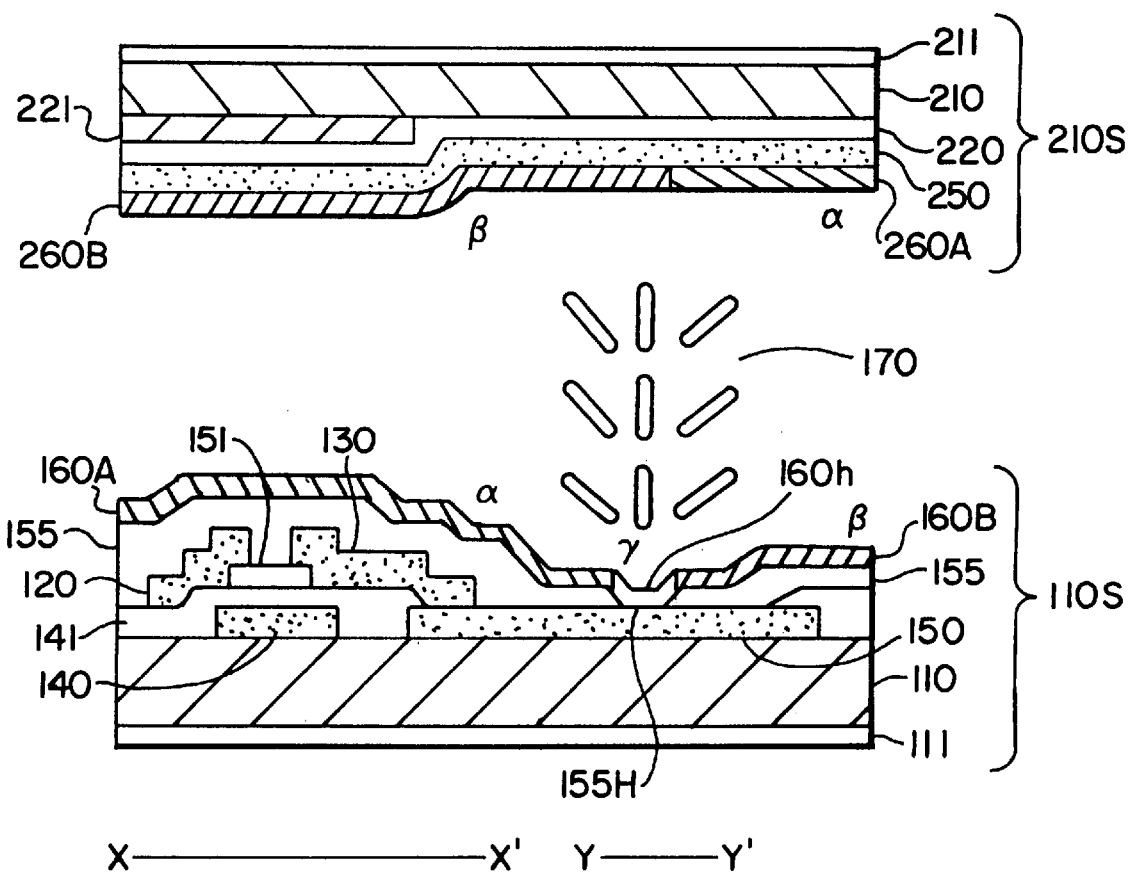
FIG. 8 schematically illustrates a cross-sectional cut view of the fourth preferred embodiment of the present invention.

In FIG. 8, the numerals 120, 130 & 140 denote a source electrode, a drain electrode & a gate electrode, respectively; and the numerals 220 & 221 denote a color filter and black matrix, respectively. The black matrix is formed of dark material for making a peripheral of a cell, which may also be called a display cell, non-transparent or low-reflective, and is usually of a grid shape. However, there may also be employed other shapes, such as a stripe, etc. The numeral 150 denotes a cell electrode for applying a voltage to the cell together with an opposing electrode 250, where both the electrodes are formed of a transparent ITO (indium-titan-oxide). The TFT and cell electrode 150 in TFT assembly are coated with a protection film 155.

Upon CF substrate assembly 210S is coated a polyimide film, which is then processed by an ultra violet light and by a rubbing operation so as to form alignment films 260A & 260B having pre-tilt angles $\alpha$ (85°) and $\beta$ (89.5°), respectively, where the rubbing operation is performed along the direction from 260A to 260B. The structure and the method of forming the alignment films are identical to those of the second preferred embodiment.

Upon TFT substrate assembly 110S, too, similarly to the second preferred embodiment, are arranged alignment films 160A & 160B coated and rubbed along the direction from 160B to 160A, and so as to have pre-tilt angles $\alpha$ (85°) and $\beta$ (89.5°). Moreover, alignment films are provided with a depression 155H substantially at the center of cell electrode 150 so that pre-tilt angle γ of alignment film 160h be 89.8°, according to a method similar to that of the second embodiment of the present invention.

In fabricating depression 155H of the alignment film, a protection film 155 for protecting the TFT is utilized. Protection film 155 is formed on the entire surface with silicon nitride or silicon oxide, etc. The depression H is formed concurrently to patterning the protection film for a predetermined pattern by the use of photolithography. By coating the alignment film of polyimide thereon depression 155H of the alignment film can be fabricated.

The advantage of the fourth preferred embodiment is in that depression 155H of the alignment film can be formed by the utilization of protection layer 155 for protecting TFT without increasing the processing steps.

Figure 7B:
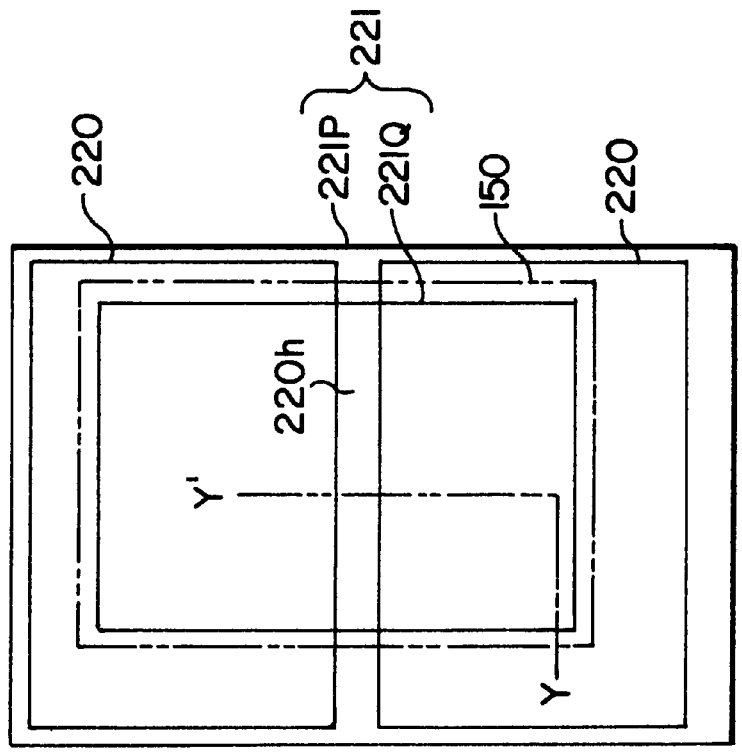
FIGS. 7A & 7B show plan views schematically illustrating a fourth and fifth preferred embodiments, respectively.
Figure 7A:
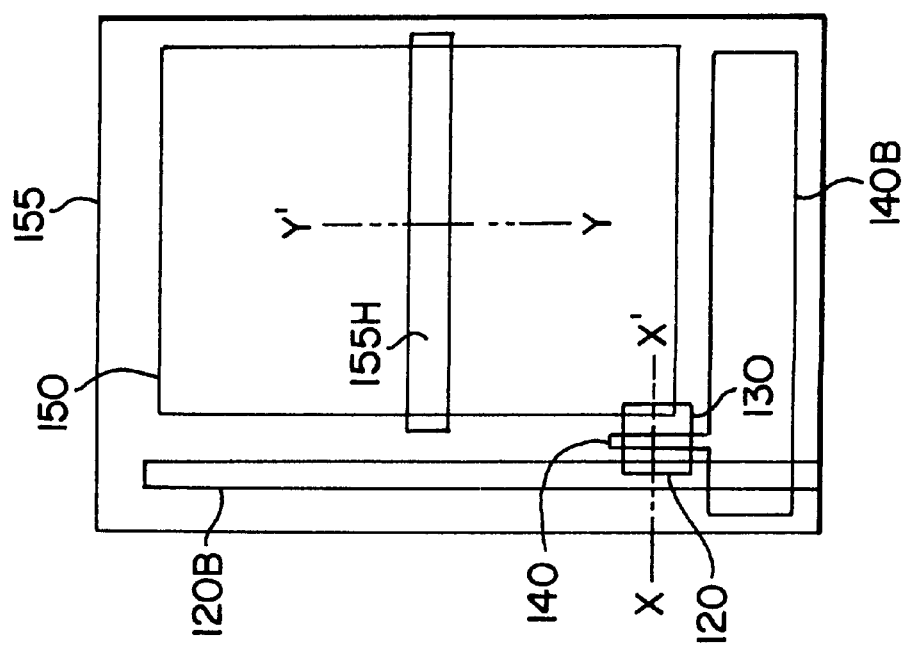

FIG. 7A illustrates with solid lines for the sake of convenience a plan view of the pattern corresponding to each layer of FIG. 8. The portions denoted with X–X' & Y–Y' in FIG. 7A correspond respectively to the portion denoted with X–X' & Y–Y' of cross-sectional cut view in FIG. 8. The same numerals are denoted for the parts that are the same to as those of FIG. 8. The numeral 120B denotes a source bus electrode; and the numeral 140B denotes a gate bus electrode.

In the color liquid crystal display device provided with alignment films 160A, 160B, 160h, 260A & 260B shown in FIG. 8, liquid crystal molecules 170 are aligned almost vertical right above depression 155H so as to form a separating wall for the two domains to be stably established as shown in the figure. The functions and effects of the fourth preferred embodiment are substantially identical to those of the second preferred embodiment.

Viewing angle characteristics along the vertical direction as well as along the horizontal direction are identical to those of the second preferred embodiment.

A fifth preferred embodiment of the present invention is hereinafter described, that is a modification of the second preferred embodiment as an LCD device, where the depression at the alignment films is the only difference from the fourth preferred embodiment, referring to FIG. 9, which is a cross-sectional cut view, and FIG. 7B, which is a plan view.

The fifth preferred embodiment is different from the fourth preferred embodiment only in the constitution related to the alignment films and the undercoat therebeneath, while all other elements are identical to those of fourth preferred embodiment. In other words, the feature of the fifth preferred embodiment is in the following two points that: (1) the depression of the alignment films is located on the CF substrate assembly 210S, but not on the TFT substrate assembly 110S, and (2) a notch 220H is formed on the CF layer in order to form a depression 260h of alignment film. All others are identical to those of the fourth preferred embodiment.

In forming notch 260H of alignment films, the CF layer 220 is utilized in the present embodiment. After a CF layer is coated upon the entire surface, in patterning the CF layer to a predetermined pattern by the use of photolithography a notch 260H is formed as well by etching the substantially central part of the cell. Depression 260h of alignment films is completed by coating a polyimide film on the entire surface.

The feature of the structure and the fabrication method of the fifth preferred embodiment is in that depression of the alignment film can be accomplished by the utilization of CF layer 220 without increasing the number of processing steps.

All the other conditions, such as the pre-tilt angles of alignment films 160A & 260A and alignment films 160B & 260B being α (85°) and β (89.5°), respectively; the rubbing operations being performed along the directions from 160B to 160A and from 260A to 260B; and the pre-tilt angle γ of alignment film 260h in the depression 220H being 89.8°, are identical to those of the fourth preferred embodiment.

Figure 9:
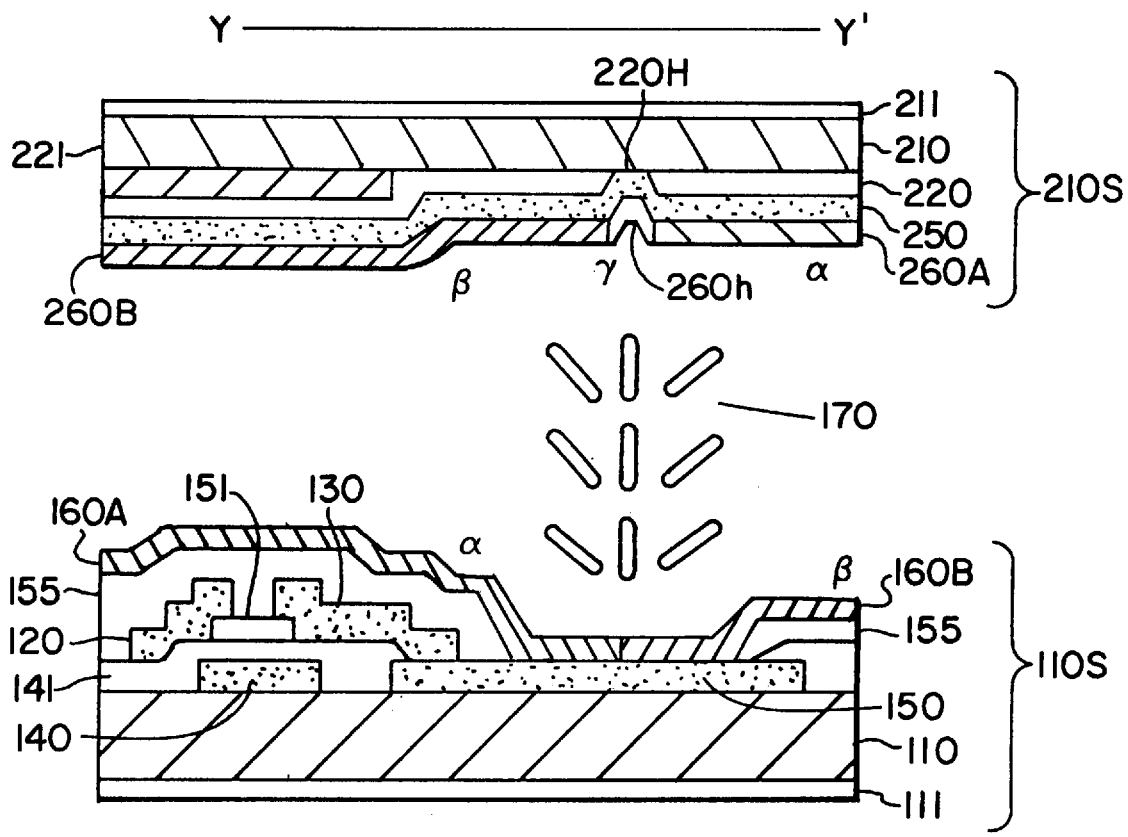
FIG. 9 schematically illustrates a cross-sectional cut view of the fifth preferred embodiment of the present invention.

FIG. 7B illustrates a plan view of the pattern corresponding to each layer of FIG. 9, denoted with solid lines for the sake of convenience. The same numerals are denoted as corresponding to the same part as those of FIG. 9. However, the two-dot chain line 150 indicates cell electrode 150 of FIG. 7A in order to clarify the positional relation. An area surrounded by the numerals 221P and 221Q is a black matrix. Y–Y' of FIG. 7B corresponds to Y–Y' of cross-sectional cut view of FIG. 9. The reason why Y–Y' is bent is in order for the lines to indicate the corresponding cross-sectional cut view including the TFT area of the substrate opposing thereto.

The fifth preferred embodiment is basically identical to the fourth preferred embodiment except that the location of depression 260h of the alignment films is different.

Accordingly, the function, the effect and the viewing angle characteristic are identical to those of the fourth preferred embodiment.

It is also possible to combine the TFT substrate assembly 110S of the fourth preferred embodiment and the CF substrate assembly 210S so as to constitute a liquid crystal display device.

Figure 10:
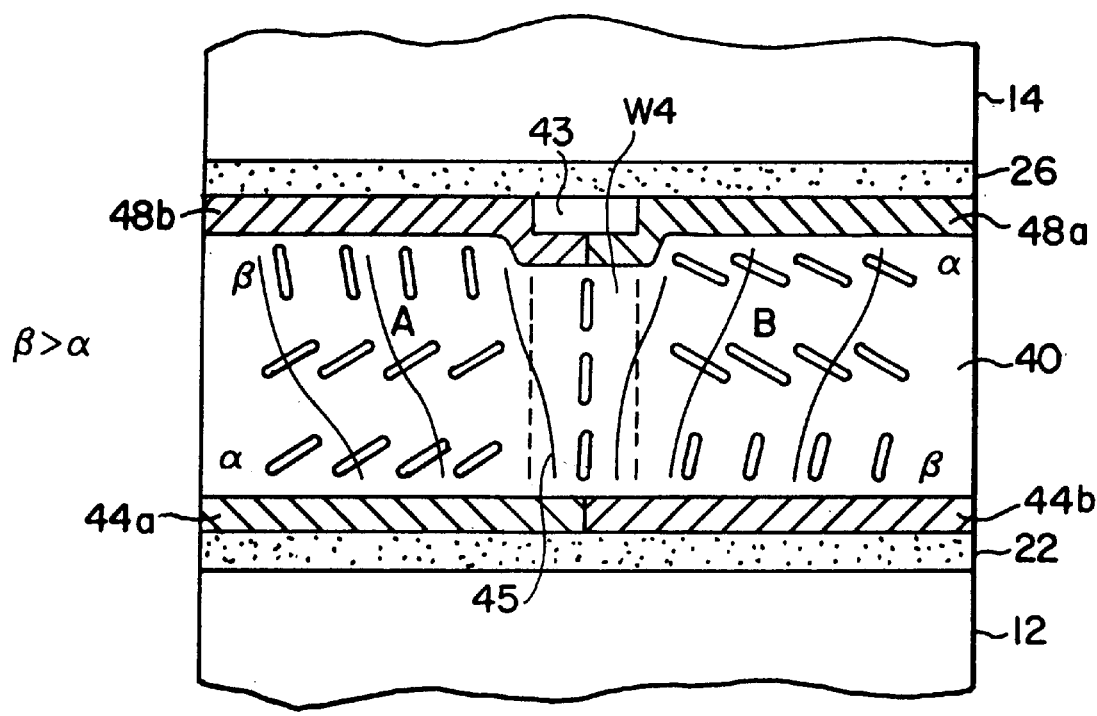
FIG. 10 schematically illustrates a cross-sectional cut view of the sixth preferred embodiment of the present invention.

A sixth preferred embodiment of the present invention is hereinafter described referring to FIG. 10.

A primary feature of the sixth preferred embodiment is that a belt-like insulating film 43 is formed on a place at which the separating wall will be formed, extending along the boundary of alignment films respectively having different pre-tilt angles. This insulating film 43 is formed of a 10 μm wide and 5000 Å thick silicon nitride (SiN) film. The SiN film is formed by a plasma CVD (chemical vapor deposition), and then is patterned by a dry etching method using a $CF_4$ (chlorine tetra fluoride) gas.

Upon transparent electrodes 26 having insulating film 43 are formed alignment films 48a & 48b of polyimide (Model SE1211 made by Nissan Chemicals) to have pre-tilt angles α (85°) and β (89.5°), similar to those of the first preferred embodiment. The boundary of these alignment films is placed to align are the center of insulating film 43.

The transparent electrode 22 and the alignment films 44a & 44b on the first glass substrate are identical to those of comparison sample shown in FIG. 1A. First and second glass substrates 12 & 14 are sealed together such that the boundary of alignment films 44a & 44b on the first glass substrate faces substantially the boundary of the alignment films of the second glass substrate. Next, liquid crystal material 40 is sealed in between the two glass substrates.

The thus fabricated liquid crystal display device according to the sixth preferred embodiment is compared with the comparison liquid crystal display device shown in FIG. 1A.

When observing the states of the domains while the applied voltages are kept high, the boundary of the domains are kept stable so that two kinds of domains are coexisting. On the other hand, in the comparison liquid crystal display device shown in FIG. 1A, it is confirmed that the two kinds of domains are unstable as described before, and the boundary is irregular and moves.

The superiority of the sixth preferred embodiment is in that insulating film 43 acts to lower the electric field in the alignment stabilizing region W4 therebeneath.

Consequently, the molecules in the alignment stabilizing region W4 stably align substantially vertical with respect to the alignment films. This is because the alignment stabilizing region W4 acts as a barrier, i.e. a separating wall, to the two domains existing on both sides thereof.

As a result of the observation of the viewing angle characteristic along the vertical direction and the horizontal direction of the sixth preferred embodiment, it is confirmed that the viewing angle characteristic is identical to those of the first preferred embodiment shown in FIG. 3, so as to provide a high contrast and a wide viewing angle characteristic.

Next, the conditions regarding the thickness and electrical resistance value of insulating film 43 were investigated. A trial liquid crystal display device was fabricated having different conditions of the thickness and the specific resistance values of the insulating film formed of SiN in order to evaluate the stability of the domains. The results are shown as follows in Table 1.

TABLE 1

| Film Thickness (SiN) | Domain Stability | Specific Resist. ($\Omega$ cm) | Domain Stability |
|---|---|---|---|
| 1000Å | unstable | $10^{10}$ | unstable |
| 2000Å | stable | $10^{12}$ | almost stable |
| 3000Å | stable | $10^{13}$ | stable |
| 10000Å | stable | $10^{15}$ | stable |

Specific Resist. (SiN): $10^{15}$ $\Omega$ cm
Film Thickness: 3000Å

The SiN film was formed with a plasma CVD employing $SiH_4/NH_3$ as the reaction gas, which usually provides a dielectric constant $\epsilon$ of approximately 6, and a specific resistance $\rho$ of approximately $10^{13}\Omega cm$. By controlling the composition of the reaction gas ($SiH_4/NH_3$) of the CVD, the specific resistance of SiN film, which may be sometimes denoted with a $SiN_x$ film, too, can be controlled so as to achieve the amounts of Table 1. An increase in the ratio of $SiH_4$ allows the Si rich so as to decrease the specific resistance value, and vice versa.

As for the film thickness, according to Table 1, the evaluation within the range of 1,000 to 10,000 Å, while the specific resistance is $10^{15}$ $\Omega cm$, results in that the domains are stable at thicker than 10,000 Å. On the other hand, as for the specific resistance, the evaluation within the range of $10^{10}$ to $10^{15}\Omega cm$, while the thickness is 3,000 Å, results in that the domains are stable at thicker than $10^{13}\Omega cm$.

The physical meaning of these results is as described below. Driving of liquid crystal is generally performed with AC (alternating current) waveforms. However, as the improvement of the response time of the liquid crystal, an influence within a single frame, in which a DC voltage is applied to, i.e. the influence of the DC waveforms, has to be fully considered, as well. Thus, the driving characteristics having two kinds of characteristics, that is the AC characteristic as well as the DC characteristics, must satisfy the necessary conditions for both for each characteristic. Therefore, the above-described insulating film 43 is provided in order to give the desired effect, that is the effect to decrease the electric field, must be set at predetermined conditions of both the AC characteristic as well as the DC characteristics.

At first, from the view point of the DC characteristic the specific resistance $\rho$ of the insulating film is required to be high enough to influence the resistance of the liquid crystal layer. In other words, in order to be equal to or higher than the specific resistance of liquid crystal, for example $10^{12}\Omega cm$ or higher for the liquid crystal for driving the TFT, the specific resistance $\rho$ of the insulating film is required to be higher than $10^{12}\Omega cm$; and higher than $\mathbf{10^{13}\Omega cm}$ is more preferable. This meets the results shown in Table 1.

Next, from the view point of AC characteristic, in order for insulating layer 43 to act to decrease the electric field strength in the liquid crystal layer just therebelow, the capacitance value, which is determined by its dielectric constant $\epsilon$, the film thickness and the film area of insulating film 43, is required to be less than approximately ten times the capacitance value of the liquid crystal layer beneath the insulating layer 43, which means that the impedance value is higher than approximately the tenth thereof. For example, approximately 6 of the dielectric constant $\epsilon$ of SiN film is approximately half of approximately 10 of the dielectric constant $\epsilon$ of liquid crystal layer; and the film thickness of approximately 2,000 Å is approximately one twenty-fifth of, for example, approximately 5 $\mu m$ thickness of liquid crystal layer. In this case, the capacitance value of insulating layer 43 is approximately ten times of the capacitance of the liquid crystal layer just therebeneath. That is an, insulating film 43 having an impedance value of approximately one tenth of the impedance of liquid crystal just therebeneath, accordingly, can give effects to the electric field of the liquid crystal layer.

Thus, the data shown in Table 1 indicates that in order for the electric field in the alignment film stabilizing region W4 to act as a separating barrier of domains A & B at both the sides thereof so that the electric field is so adequately low as the liquid crystal molecules vertically aligned therein can stably exist, there is required the insulating film 43 to have a capacitance value less than approximately ten times the liquid crystal layer just therebeneath. Accordingly, the material having the less dielectric constant $\epsilon$ is preferable, as well as the thicker film is the more preferable. Table 1 shows that the SiN film thicker than 2,000 Å and having the dielectric constant $\epsilon$ of approximately 6 is suitable. However, it results in more preferable function and effect if one uses an insulating film having the less dielectric constant $\epsilon$ and the more thickness.

Such insulating films arranged on both the substrates provide further preferable function and effect.

As material for insulating film 43, $SiO_2$ or SiOF film can also be employed other than the SiN. The $SiO_2$ film can be formed with a plasma CVD employing an $SiH_4/N_2O$ gas, and the SiOF film employing an $SiH_4/N_2/SiF_4$ gas, as the reaction gases. Generally, the dielectric constant $\epsilon$ of both the former and the latter are approximately 4 and approximately 3, respectively; and their specific resistance $\rho$ is approximately $10^{13}\Omega cm$. However, there can be values adjusted by controlling the component of the reaction gases.

Besides those inorganic materials, an organic insulating film can also be employed as insulating film 43. There can be employed organic insulating materials, such as an acrylate material LC-2001, made by Sanyo Kasei, having a dielectric constant of approximately 3 and a specific resistance of approximately $\mathbf{10^{15}\Omega cm}$, and a polyimide material RN-9001, made by Nissan Chemicals, having a dielectric constant of approximately 3 and a specific resistance of approximately $10^{16}\Omega cm$. These materials are featured in that the dielectric constant is small and the specific resistance is large compared with the above-mentioned inorganic materials.

A seventh and an eighth preferred embodiment of the present invention are hereinafter described, where thin film transistors, referred to hereinafter as TFTs, and a color filter, referred to hereinafter as a CF, are applied to the color TFT liquid crystal display device disclosed in the sixth preferred embodiment.

Figure 11B:
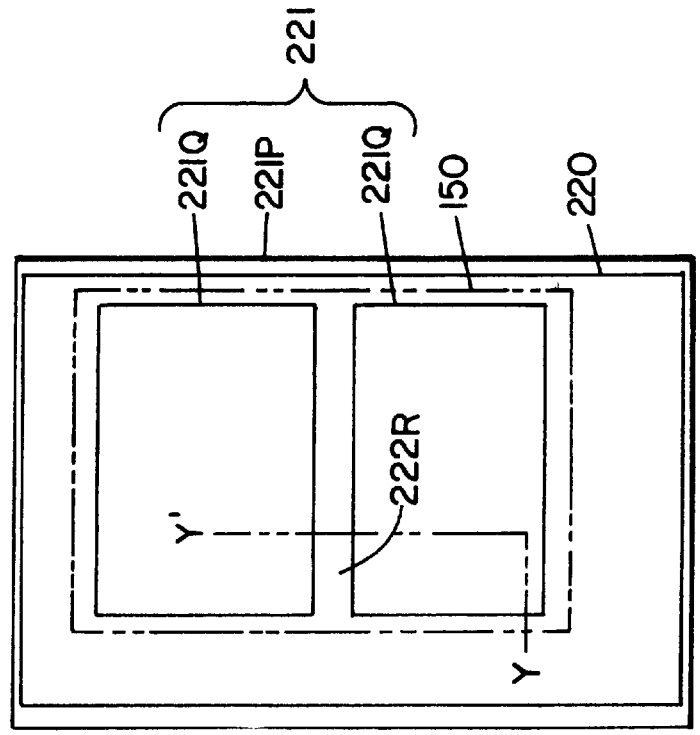
FIGS. 11A & 11B show plan views schematically illustrating a seventh and eighth preferred embodiments, respectively.
Figure 11A:
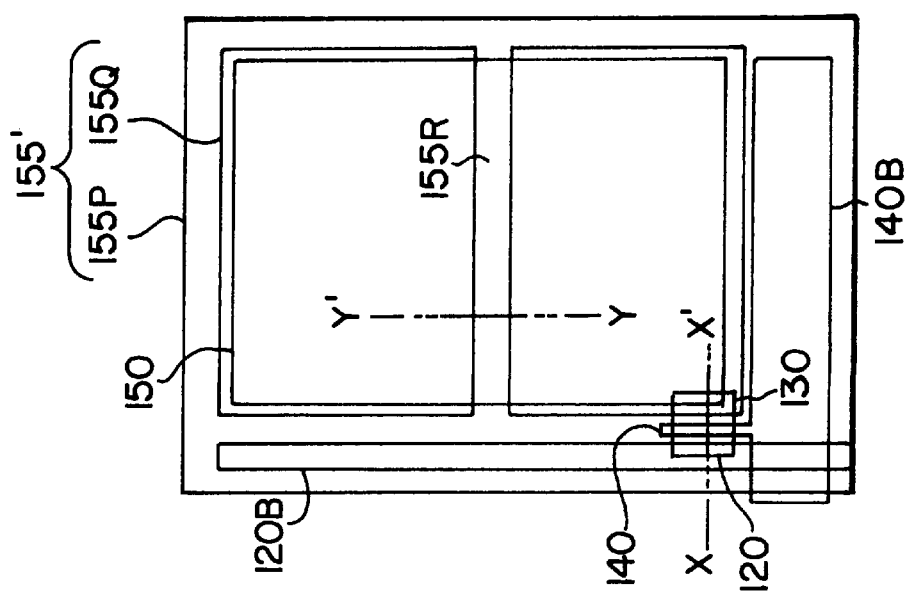
Figure 12:
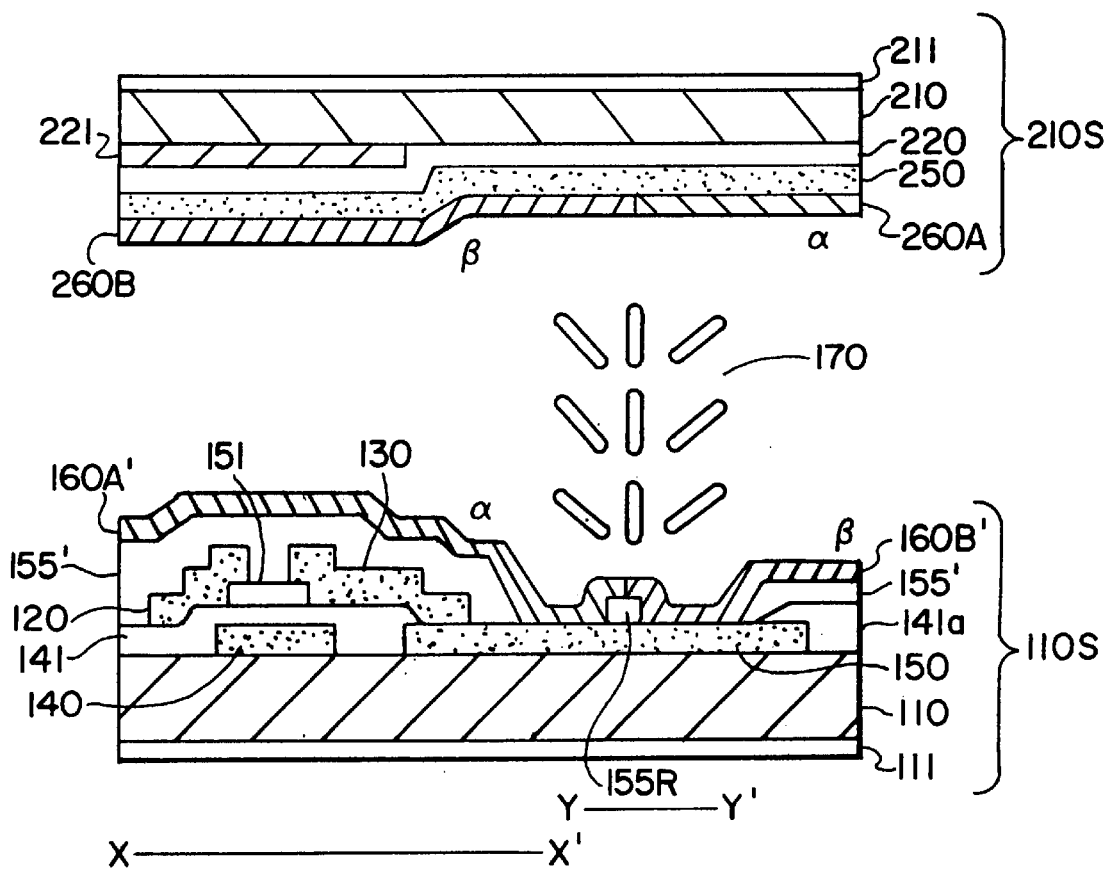
FIG. 12 schematically illustrates a cross-sectional cut view of the seventh preferred embodiment of the present invention.

The seventh preferred embodiment is such that the feature of the sixth preferred embodiment is embodied in TFT substrate 110S', whose cross-sectional cut view and plane view are illustrated in FIG. 12 and FIG. 11A, respectively.

The seventh preferred embodiment is formed with a first glass substrate assembly 110S' carrying TFTs thereon, a second glass substrate assembly 210S carrying a color filter CF thereon, referred to hereinafter as a CF substrate, liquid crystal material 170 sealed in therebetween, and polarizing plates 111 & 211 provided on outer sides of these substrates. In FIG. 12, the numerals 110 and 210 denote glass substrates; the numerals 120, 130 & 140 denote a source electrode, a drain electrode & a gate electrode, respectively, and the numerals 220 & 221 denote a color filter and a black matrix, respectively. The numeral 150 denotes a cell electrode, and the numeral 250 denotes an opposing electrode, each formed with a transparent ITO.

In TET substrate assembly 110S' is formed a belt-like insulating layer 155R with SiN at almost the centre of cell electrode 150. Thereupon are coated a polyimide alignment films 160A' & 160B' so as to cover the whole surface; and an ultra-violet irradiation and a rubbing process are performed so as to provide pre-tilt angles α (85°) & β (89.5°); and the rubbing operation is performed along the direction from polyimide alignment films 16OA' to 160B'. The method to form the alignment film is similar to that of the sixth preferred embodiment.

On the CF substrate assembly 210 are provided alignment films 260A & 260B having respectively pre-tilt angles α (85°) & β (89.5°) similar to the sixth preferred embodiment, which are rubbed along the direction from polyimide alignment films 260A to 260B.

In this seventh preferred embodiment, a protection layer 155' for protecting the TFTs is utilized to form the belt-like insulating layer 155R. When SiN or SiO$_2$ film is formed on the entire surface and patterned with a photolithography for a predetermined pattern, the belt-like insulating film 155R is formed concurrently. Therefore,the belt-like insulating film 155R can be accomplished without increasing the processing steps by the utilization of protection film 155' for protecting the TFTs.

FIG. 11A illustrates with solid lines for the sake of convenience a plane view of the patterns corresponding to each layer of FIG. 12. In FIG. 11, the same numerals denote the same part of FIG. 12 except that the numeral 120B denotes a source bus electrode, and the numeral 140B denotes a gate bus electrode. The area 155 is surrounded with lines 155P & 155Q is the protection film of TFT. The numeral 155R denotes the plan pattern of the belt-like insulating layer. The portions X–X' & Y–Y' in FIG. 11A correspond to the portions X–X' & Y–Y' in FIG. 12.

In the color liquid crystal display device including belt-like insulating film 155R, alignment films 160A', 160B', 260A and 260B, the liquid crystal molecules 170 are aligned such that the liquid crystal just above the insulating film 155R is aligned vertically without tilt as shown in FIG. 12; accordingly, two domains are stably formed on both the sides thereof. The functions and the effects are the same as those of the sixth preferred embodiment.

Moreover, the view angle characteristics observed from vertically and horizontally deviated angles are identical to those of the sixth preferred embodiment.

Figure 13:
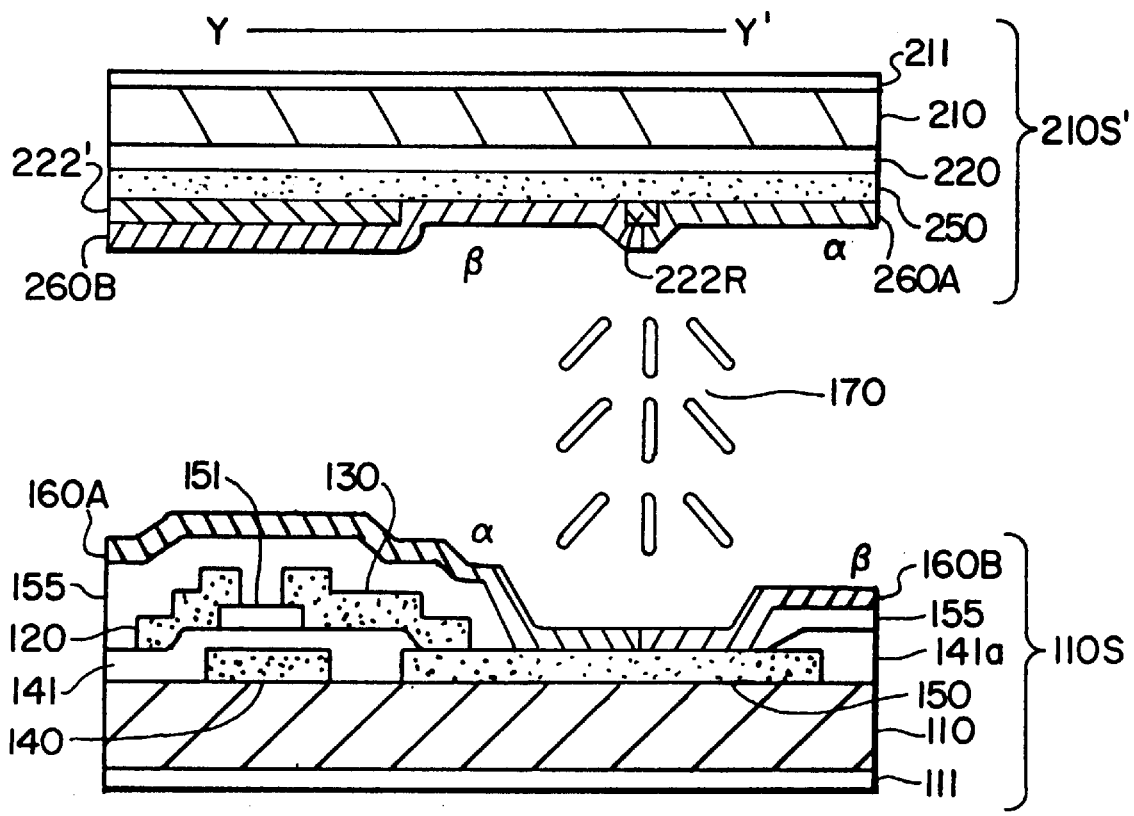
FIG. 13 schematically illustrates a cross-sectional cut view of the eighth preferred embodiment of the present invention.
Figure 14:
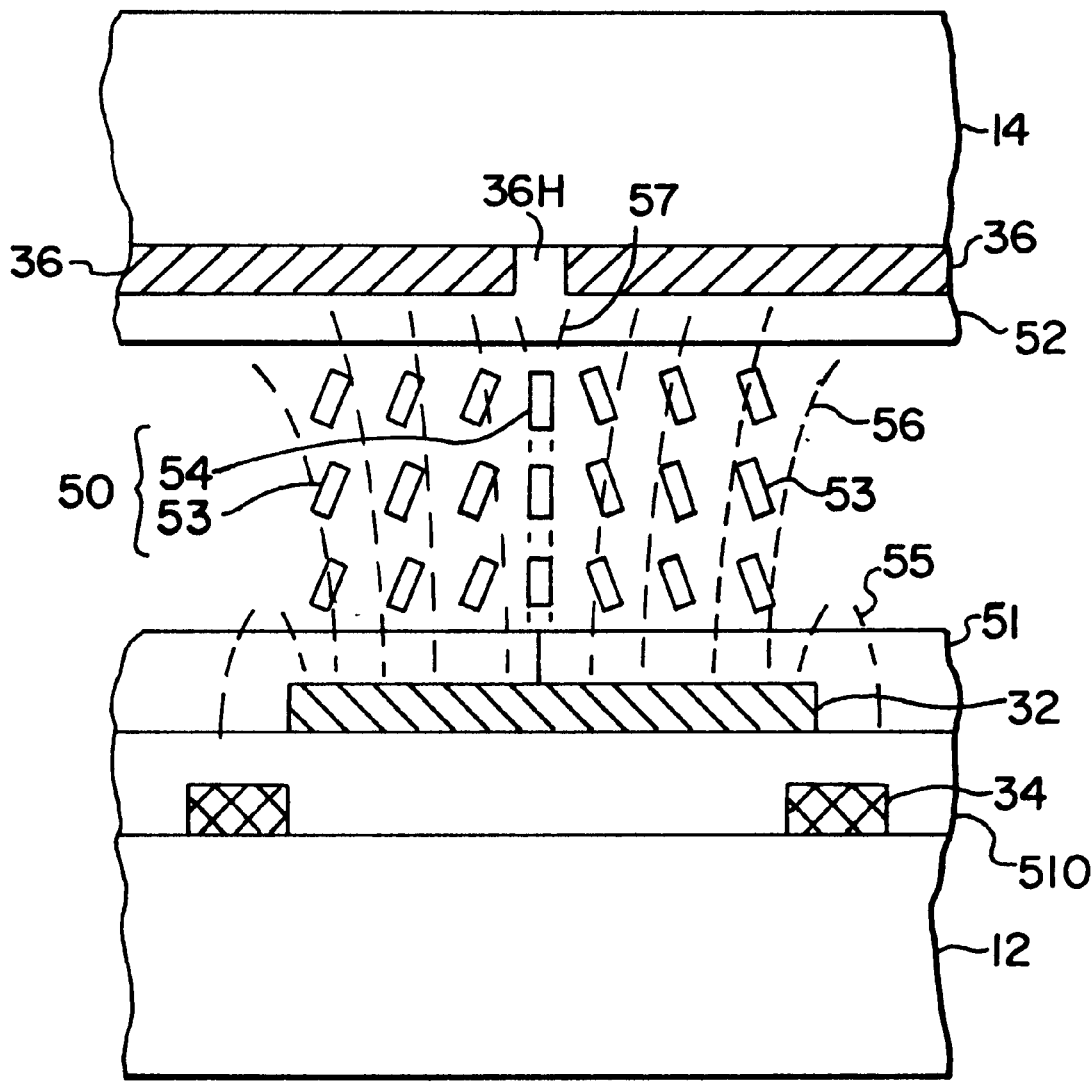
FIG. 14 schematically illustrates a cross-sectional cut view of a prior art vertical alignment type liquid crystal display device of surrounding-electrode method.
Figure 15:
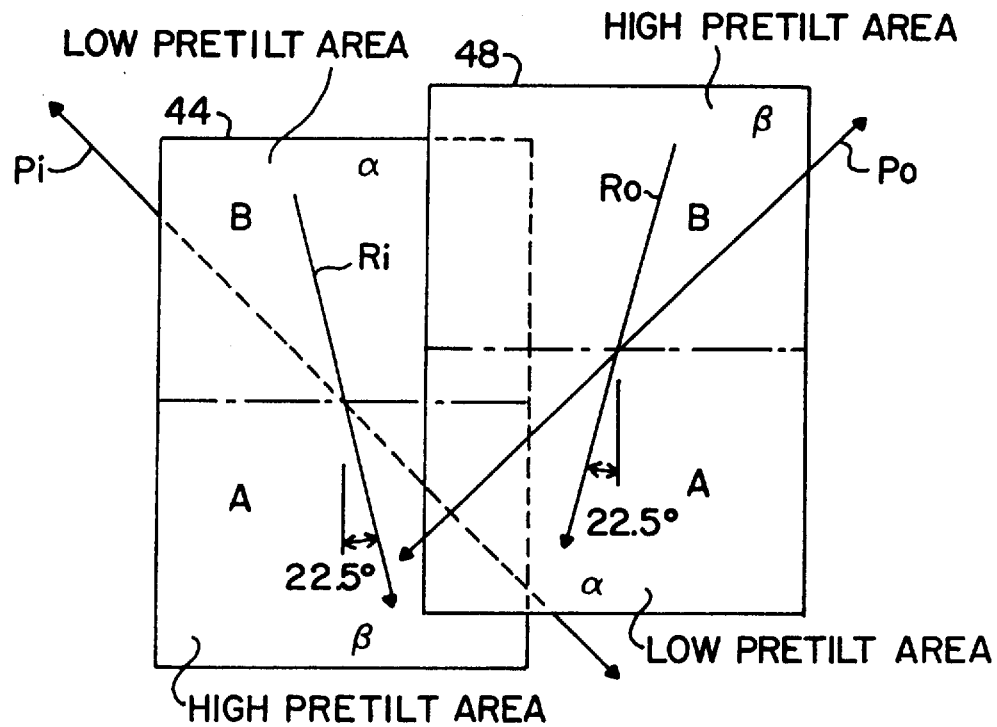
FIG. 15 schematically illustrates a cross-sectional cut view of a second prior art domain divided type liquid crystal display device;, FIG. 16 schematically illustrates a cross-sectional cut view of the second prior art liquid crystal display device shown in FIG. 15.
Figure 16:
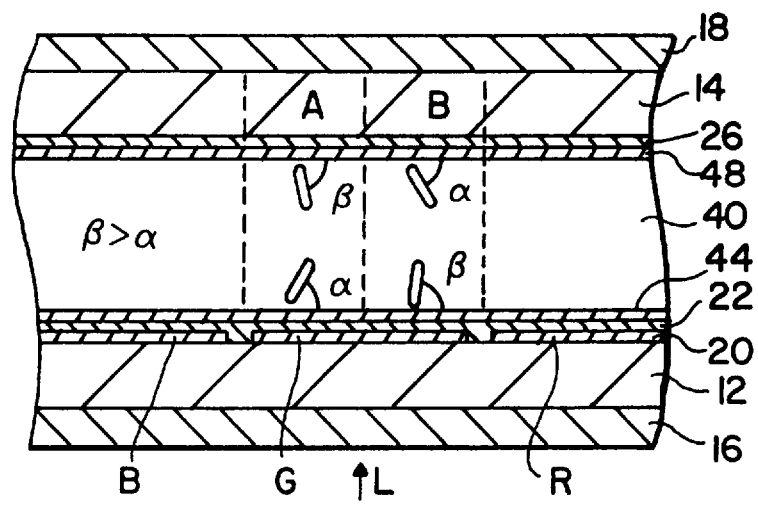
Figure 17A:
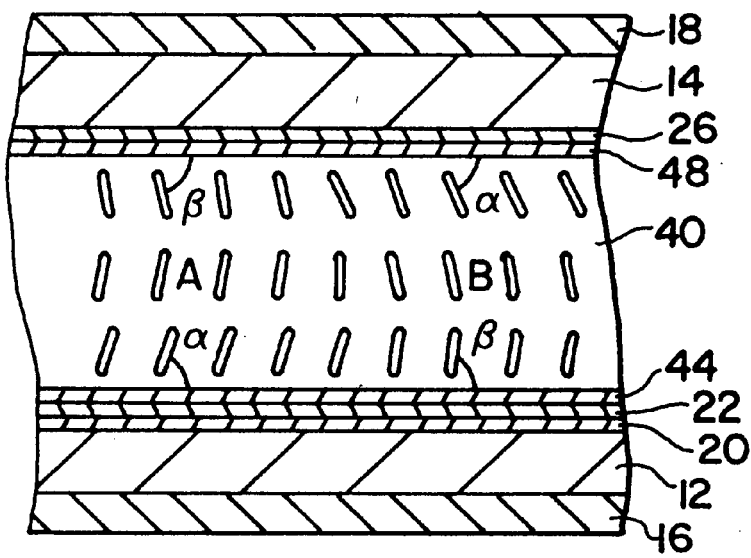
FIGS. 17A & 17B schematically illustrate the operations of the liquid crystal display devices shown in FIGS. 15 & 16.
Figure 17B:
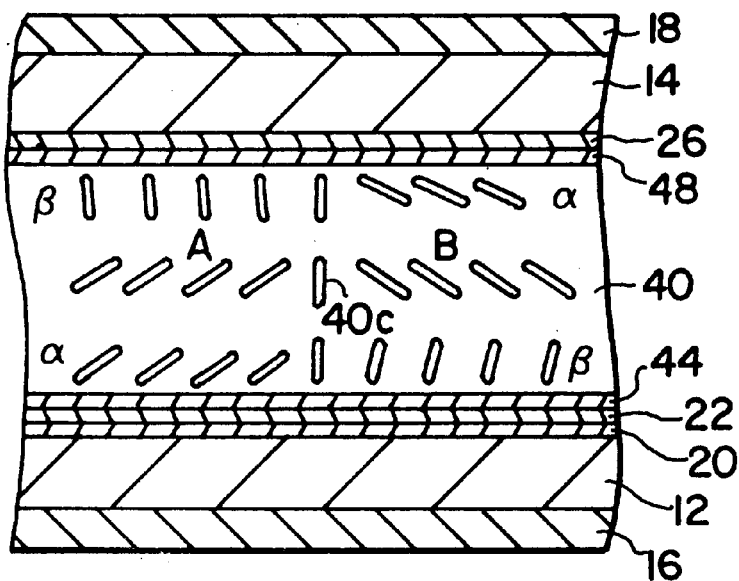

The eighth preferred embodiment is such that the constitution of the sixth preferred embodiment is embodied in CF substrate, whose cross-sectional cut view and plan view are illustrated in FIG. 13 and FIG. 11B, respectively. In the eighth preferred embodiment, the location, the material and the fabrication method of the belt-like insulating film are different from those of the seventh preferred embodiment.

The features of the eighth preferred embodiment are in that: (1) a belt-like insulating film 222R is on the CF substrate assembly 210S', but not on the TFT substrate assembly 110S, and (2) a layer of the black matrix is utilized in forming belt-like insulating film 222R. Accordingly, in TFT substrate assembly 100S the constitution is identical to that of the seventh preferred embodiment except the belt-like insulating film 155R; while in CF substrate assembly 210S the constitution is different as follows.

Black matrix layer 221 & 222 are formed upon the substrate surface in CF substrate assembly 210S in the seventh preferred embodiment; however, in the eighth preferred embodiment, black matrix layer 222' was formed upon opposing electrodes 250. Black matrix layer 222' is formed by coating a formation material, for example, a resin added with carbon black, upon the entire surface, and by being patterned to a predetermined shape with a photolithography technique. In this patterning process the pattern is such that a belt-like pattern remains at the substantially central portion of the cell whereby a belt-like insulating film 222R can be formed concurrent to the fabrication of the black matrix. Thus, the belt-like insulating film 222R can be accomplished by the utilization of black matrix layer 222' without increasing the processing steps.

The pre-tilt angles of alignment films 160A & 260A and alignment films 160B & 260B are respectively α (85°) and β (89.5°), and the rubbing operations are respectively performed along the directions from alignment films 160A to 160B, and from alignment films 260B to 260A.

FIG. 11B illustrates with solid lines for the sake of convenience a plan view of the patterns corresponding to each layer of FIG. 13. In FIG. 11, the same numerals denote the same part of FIG. 13. However, the two-dot chain line 150 denotes cell electrode 150 of FIG. 11A in order to clarify the positional relation. The area surrounded by lines 221P & 221Q is the black matrix. The numeral 222R denotes a plan view of the belt-like insulating film. The portion Y–Y' in FIG. 11B corresponds to the portion Y–Y' in FIG. 13. The reason why the line Y–Y' is bent is in order to indicate the cross-sectional cut views corresponding to the portions including the TFT on the opposing glass substrate assembly.

The eighth preferred embodiment is basically identical to the seventh preferred embodiment except the location of the belt-like insulating film 222R; accordingly, the function, the effect and the view angle characteristic are identical to those of the fourth preferred embodiment.

Though in the second preferred embodiment the shape of the depression was explained with a typical fabrication method thereof, it is apparent that the shape and the process may be arbitrary as long as the rubbing strength is different from that of other surfaces so as to provide different pre-tilt angles.

The above preferred embodiments are described mainly with respect to the liquid crystal display device employing TFTs; however, it is apparent that the present invention can be embodied in a liquid crystal display device employing a driving element, such as MIM (metal-insulator-metal) elements or diodes, or a simple matrix type liquid crystal display device, or a fixed pattern type liquid crystal display device.

According to the present invention, there can be accomplished a liquid crystal display device capable of sustaining stable domains regardless of the applied voltage level, so as to realize a liquid crystal display device allowing a wide view angle as well as a high contrast.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What we claim is:

1. A liquid crystal display device having at least one pixel comprising:

first and second opposing substrates having inner surfaces facing each other;

electrodes arranged on each of the inner surfaces of said substrates;

liquid crystal having a negative dielectric an isotropy sealed in a gap between said substrates, said liquid crystal being controlled by a voltage applied thereto via said electrodes, molecules in said liquid crystal being aligned substantially vertically when applied with substantially no voltage thereto, a majority of said molecules being aligned so as to tilt towards one of said substrates when the voltage is applied thereto, said liquid crystal having first, second, and third domains within a single pixel, the first and second domains being separated by the third domain, wherein molecules of said liquid crystal in the third domain are substantially vertically aligned regardless of whether or not voltage is applied thereto via said electrodes; and first and second alignment films arranged on the corresponding inner surfaces said first and second substrates having said electrodes thereon, respectively, each of said alignment films having a first region and a second region within the single pixel, and the first and second regions of at least said first alignment film adjoining directly to each other along a boundary therebetween, wherein a pre-tilt angle of the molecules of said liquid crystal on each of the first regions is larger than a pre-tilt angle of the molecules of said liquid crystal on each of the second regions of said alignment films, and the first and second domains are disposed on the first and second regions, respectively, and at least a part of the third domain is disposed on a marginal portion of the first region adjoining to the boundary between the first and second regions of said first alignment film.

2. A liquid crystal display device as recited in claim 1, wherein said first and second regions of said second alignment film adjoin directly to each other along a boundary therebetween, wherein the first and second domains are disposed on the second and first regions of said second alignment film, respectively, and the third domain is disposed on a marginal portion of the first region adjoining to the boundary between the first and second regions of said second alignment film.

3. A liquid crystal display device as recited in claim 1, further comprising a third region between the first and second regions of said second alignment film, said third region separating the first and second regions, wherein a pre-tilt angle of the molecules of said liquid crystal on the third region is larger than the pre-tilt angles of the molecules of said liquid crystal on the first and second regions, and the first, second and third domains are disposed, respectively, on the first, second and third regions of said second alignment film.

4. A liquid crystal display device as recited in claim 3, wherein said second alignment film is depressed in the third region.

5. A liquid crystal display device as recited in claim 4, wherein a depth of the depressed third region is in a range from 1 $\mu$m to 3 $\mu$m.

6. A liquid crystal display device as recited in claim 4, wherein said second substrate comprises a driving element for controlling a voltage applied to said display cell formed of a plurality of said domains; and the depressed third region is formed in a protection layer for covering said driving element.

7. A liquid crystal display device as recited in claim 3, wherein a width of the third region is in a range from 5 to 20 $\mu$m.

8. A liquid crystal display device as cited in claim 3, wherein the third region has an undercoating film for increasing the pre-tilt angle of said second alignment film.

9. A liquid crystal display device as recited in claim 1, further comprising an insulating film between said electrode on said first substrate and said first alignment film, said insulating film extending to marginal regions along the boundary between the first and second regions of said first alignment film, wherein the first and second regions of said second alignment film are adjoining directly to each other along a boundary therebetween, and the boundaries of said first and second alignment films are opposing to each other across the third domain of said liquid crystal disposed on the marginal regions of said first alignment film.

10. A liquid crystal display device as recited in claim 9, wherein said insulating film has an approximate thickness of between 0.2 and 2 $\mu$m.

11. A liquid crystal display device as recited in claim 9, wherein said insulating film has a specific resistance of at least approximately $10^{12}\Omega$cm.

12. A liquid crystal display device as recited in claim 9, wherein one of said substrates comprises a dark color member for making outer edges of said pixel opaque or lowly reflective, and further wherein a reflecting film is formed of a material identical to said dark color member.

13. A liquid crystal display device as recited in claim 9, wherein said first substrate comprises a driving element for controlling a voltage applied to each of said pixels, and said insulating film is formed of a material identical to a protection film.

14. A liquid crystal display device as cited in claim 9, wherein a gap between said opposing alignment films is smaller in the third domain than gaps in the first and second domains.

15. A liquid crystal display device as recited in claim 1, wherein:

said alignment film on said first substrate includes a portion thereof that has a higher pre-tilt angle than the remainder of said alignment film on said first substrate;

said alignment film on said second substrate includes a portion thereof that has a higher pre-tilt angle than the remainder of said alignment film on said second substrate; and said higher pre-tilt angle portion of said first substrate and said higher pre-tilt angle portion of said second substrate overlap each other across said third region.

16. A liquid crystal display device as recited in claim 15, wherein said higher pre-tilt angle portion of said first substrate and said higher pre-tilt angle portion of said second substrate have pre-tilt angles that are substantially equal.

17. A liquid crystal display device comprising:

a pair of substrates, each having an electrode on an inner surface of said substrate, wherein one of said substrates in said pair includes a driving element for controlling a voltage applied to said display cell:

an alignment film on each said electrode;

a liquid crystal material between said alignment films;

a plurality of display cells in said liquid crystal material, each controlled by a voltage applied from said electrodes, each display cell comprising:

a plurality of domains, each having a mutually different pre-tilt angle, said pre-tilt angle being determined by said alignment films forming said domains; and a separator region provided along a boundary of said domains, for preventing influence from a pre-tilt angle of an adjacent domain, wherein liquid crystal molecules in said separator region are aligned substantially vertically with respect to said alignment film and are substantially stably maintained in said substantially vertical alignment regardless of the voltage application, even when substantially no voltage is applied thereto;

wherein alignment films having larger pre-tilt angles than at least one other alignment film are facing each other across said separator region, between said paired substrates;

and further wherein at least one of said alignment films with a larger pre-tilt angle than at least one other alignment film includes a depression at said boundary, and said depression is formed in a protection layer for protecting said driving element.

18. A liquid crystal display device as recited in claim 17, wherein at least a portion of said alignment film comprises an undercoating film for increasing said pre-tilt angle of said alignment film.

19. A liquid crystal display device as recited in claim 17, wherein a width of a region where said alignment films having said larger pre-tilt angles are facing each other is in a range from 5 to 20 $\mu$m.

20. A liquid crystal display device as recited in claim 17, wherein one of said substrates in said pair comprises a color filter corresponding to a display cell formed of a plurality of said domains; and said depression is formed in a layer of said color filter.

21. A liquid crystal display device as recited in claim 17, wherein said separator region comprises an insulating film between said electrode and said alignment film.

22. A liquid crystal display device as recited in claim 21, wherein said insulating film has an approximate thickness of between 0.2 and 2 $\mu$m.

23. A liquid crystal device as recited in claim 21, wherein said insulating film has a specific resistance of at least approximately $10^{12}\Omega$cm.

24. A liquid crystal display device as recited in claim 21, wherein one of said substrates in said pair comprises a dark color member for making outer edges of said display cells opaque or lowly reflective, and further wherein a reflecting film is formed of a material identical to said dark color member.

25. A liquid crystal display device as recited in claim 21, wherein said first substrate comprises a driving element for controlling a voltage applied to each of said display cells, and said insulating film is formed of a material identical to a protection film.

26. A liquid crystal display device comprising:

a first and a second substrate in a pair arranged to face each other, wherein one of said substrates in said pair includes a driving element for controlling a voltage applied to a display cell formed of a plurality of domains;

electrodes arranged on inner surfaces of each of said substrates;

liquid crystal sealed in a gap between said substrates, the liquid crystal having a negative dielectric an isotropy, said liquid crystal being controlled by a voltage applied thereto via said electrodes, molecules in said liquid crystal being aligned substantially vertically when applied with substantially no voltage thereto, a majority of said molecules being aligned so as to tilt towards one of said substrates when said voltage is applied thereto;

an alignment film arranged on each said electrode on each said substrate, each of said alignment films being a vertical alignment film for substantially vertically aligning said liquid crystal, said alignment films forming a plurality of said domains within each of said display cells, wherein each of said domains has a different pre-tilt angle; and said liquid crystal further comprising a region for stabilizing said alignment at a boundary between adjacent domains within said single cell, wherein said liquid crystal molecules in said region for stabilizing are substantially vertically aligned and are substantially stably maintained in said substantially vertical alignment regardless of whether or not a voltage is being applied thereto;

wherein alignment films having larger pre-tilt angles than at least one other alignment film are facing each other across said region for stabilizing the alignment, between said paired substrates;

and further wherein at least one of said alignment films with a larger pre-tilt angle than at least one other alignment film includes a depression at said boundary, and said depression is formed in a protection layer for covering said driving element.

\* \* \* \* \*

UNITED STATES PATENT AND TRADEMARK OFFICE
CERTIFICATE OF CORRECTION

PATENT NO.   : 6,040,885
DATED        : March 21, 2000
INVENTOR(S)  : Koike et al.

It is certified that error appears in the above-identified patent and that said Letters Patent is hereby corrected as shown below:

Title page,
Item [56], please add:
Koma et al. "Display Characteristics of TFT-LCD Using Surrounding-Electrode Method"; pp. 308-309; September 20-22, 1983;

Matsuoka et al., "Wide Viewing Angle TN Cell Using Surrounding -Electrode Method"; pp. 62-63; October 1-3, 1994;

Koma et al., "No-Rub Multi-Domain TFT-LCD Using Surrounding-Electrode Method"; SID Digest; pp. 869-872;

Koma et al., "Development of Simple Process to Fabricate High-Quality TFT-LCDs"; SID 96 Digest; pp. 558-561; May 12, 1996;

Column 15,
Line 31, After "surfaces" insert -- of --

Signed and Sealed this

Nineteenth Day of February, 2002

Attest:

Attesting Officer

JAMES E. ROGAN
*Director of the United States Patent and Trademark Office*